US011159523B2

(12) United States Patent
Zager et al.

(10) Patent No.: US 11,159,523 B2
(45) Date of Patent: *Oct. 26, 2021

(54) RAPID IDENTIFICATION OF MESSAGE AUTHENTICATION

(71) Applicant: Iconix, Inc., San Jose, CA (US)

(72) Inventors: Robert Philip Zager, Saratoga, CA (US); Jose Jesus Picazo, Jr., Livermore, CA (US); Nageshwara Rao Vempaty, Palo Alto, CA (US); William Ames, San Jose, CA (US); Vikram Duvvoori, Salinas, CA (US)

(73) Assignee: Iconix, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/051,665

(22) Filed: Aug. 1, 2018

(65) Prior Publication Data
US 2018/0367534 A1 Dec. 20, 2018

Related U.S. Application Data

(63) Continuation of application No. 14/556,332, filed on Dec. 1, 2014, now Pat. No. 10,063,545, which is a
(Continued)

(51) Int. Cl.
*H04L 9/00* (2006.01)
*H04L 29/06* (2006.01)
(Continued)

(52) U.S. Cl.
CPC ........ *H04L 63/0876* (2013.01); *G06Q 20/04* (2013.01); *G06Q 20/29* (2013.01);
(Continued)

(58) Field of Classification Search
CPC ............... H04L 63/126; H04L 63/0826; H04L 63/0876; G06Q 20/29; G06Q 20/04
See application file for complete search history.

(56) References Cited

U.S. PATENT DOCUMENTS 5,771,289 A 6/1998 Kuzma
5,999,967 A 12/1999 Sundsted
(Continued)

FOREIGN PATENT DOCUMENTS

WO WO-0195588 A2 12/2001
WO WO-03001326 A2 1/2003
(Continued)

OTHER PUBLICATIONS

US 8,032,595 B2, 10/2011, Tokuda et al. (withdrawn)
(Continued)

*Primary Examiner* — Beemnet W Dada
(74) *Attorney, Agent, or Firm* — Schwegman Lundberg & Woessner, P.A.

(57) ABSTRACT

Techniques are presented for uniquely identifying authentication associated with messages. A message is inspected for sender or domain identifying information associated with a sender of the message or a sender's domain. The identifying information is authenticated, and if authentication, then distinctive metadata is associated with the message. The distinctive metadata is presented or played in connection with the message for purposes of readily identifying the authentication.

17 Claims, 3 Drawing Sheets

Related U.S. Application Data continuation of application No. 13/269,837, filed on Oct. 10, 2011, now Pat. No. 8,903,742, which is a continuation-in-part of application No. 11/072,791, filed on Mar. 3, 2005, now Pat. No. 8,073,910, and a continuation of application No. 11/518,071, filed on Sep. 8, 2006, now abandoned, which is a continuation-in-part of application No. 10/778,956, filed on Feb. 12, 2004, now abandoned.

(51) Int. Cl.
*G06Q 20/04* (2012.01)
*G06Q 20/22* (2012.01)
*H04L 12/58* (2006.01)

(52) U.S. Cl.
CPC ............ *H04L 51/12* (2013.01); *H04L 63/126* (2013.01); *H04L 63/0823* (2013.01)

(56) References Cited

U.S. PATENT DOCUMENTS

| | | | |
|---|---|---|---|
| 6,029,150 | A | 2/2000 | Kravitz |
| 6,047,272 | A | 4/2000 | Biliris et al. |
| 6,052,709 | A * | 4/2000 | Paul ................. G06Q 10/107 709/202 |
| 6,073,167 | A | 6/2000 | Poulton et al. |
| 6,356,935 | B1 | 3/2002 | Gibbs |
| 6,356,937 | B1 | 3/2002 | Montville et al. |
| 6,640,301 | B1 | 10/2003 | Ng |
| 6,697,462 | B2 | 2/2004 | Raymond |
| 6,732,154 | B1 | 5/2004 | Poulton et al. |
| 6,760,721 | B1 | 7/2004 | Chasen et al. |
| 6,779,178 | B1 | 8/2004 | Lloyd et al. |
| 6,898,625 | B2 | 5/2005 | Henry et al. |
| 6,931,397 | B1 | 8/2005 | Sundaresan |
| 6,959,326 | B1 | 10/2005 | Day et al. |
| 6,996,606 | B2 | 2/2006 | Hasegawa |
| 7,010,144 | B1 | 3/2006 | Davis et al. |
| 7,020,781 | B1 | 3/2006 | Saw et al. |
| 7,072,943 | B2 | 7/2006 | Landesmann |
| 7,305,556 | B2 | 12/2007 | Slick et al. |
| 7,308,572 | B2 | 12/2007 | Goh et al. |
| 7,877,789 | B2 | 1/2011 | Dreymann |
| 7,917,756 | B2 | 3/2011 | Dreymann |
| 7,917,943 | B1 | 3/2011 | Dreymann et al. |
| 8,028,335 | B2 | 9/2011 | Udezue et al. |
| 8,073,910 | B2 | 12/2011 | Tokuda et al. |
| 8,145,707 | B2 | 3/2012 | Thayer et al. |
| 8,156,190 | B2 | 4/2012 | Thayer et al. |
| 8,166,407 | B2 | 4/2012 | Lee et al. |
| 8,180,852 | B2 | 5/2012 | Lee et al. |
| 8,239,874 | B2 | 8/2012 | Anderson et al. |
| 8,352,742 | B2 | 1/2013 | Thayer et al. |
| 8,364,771 | B2 | 1/2013 | Thayer et al. |
| 8,370,444 | B2 | 2/2013 | Thayer et al. |
| 8,413,059 | B2 | 4/2013 | Lee et al. |
| 8,429,744 | B1 | 4/2013 | Oliver et al. |
| 8,600,936 | B2 | 12/2013 | Menefee |
| 8,621,021 | B2 | 12/2013 | Provo |
| 8,626,828 | B2 | 1/2014 | Lee et al. |
| 8,635,285 | B2 | 1/2014 | D'amato et al. |
| 8,738,719 | B2 | 5/2014 | Lee et al. |
| 8,768,846 | B2 | 7/2014 | Deluca et al. |
| 8,903,742 | B2 | 12/2014 | Robert et al. |
| 10,063,545 | B2 | 8/2018 | Zager et al. |
| 2001/0034763 | A1 | 10/2001 | Jacobs et al. |
| 2002/0029166 | A1 | 3/2002 | Jacobs et al. |
| 2002/0111907 | A1 | 8/2002 | Ling |
| 2002/0116508 | A1 | 8/2002 | Khan |
| 2002/0143791 | A1 | 10/2002 | Levanon et al. |
| 2002/0169875 | A1 * | 11/2002 | Furui ................. H04L 63/102 709/225 |
| 2003/0031176 | A1 | 2/2003 | Sim |
| 2003/0037008 | A1 | 2/2003 | Raju et al. |
| 2003/0105712 | A1 | 6/2003 | Bodensohn |
| 2004/0003283 | A1 | 1/2004 | Goodman et al. |
| 2004/0059938 | A1 | 3/2004 | Hughes et al. |
| 2004/0068542 | A1 * | 4/2004 | Lalonde ............... G06Q 10/107 709/206 |
| 2004/0205135 | A1 | 10/2004 | Hallam-Baker et al. |
| 2004/0205216 | A1 | 10/2004 | Ballinger et al. |
| 2005/0004881 | A1 | 1/2005 | Klug |
| 2005/0015471 | A1 * | 1/2005 | Zhang ................. H04L 63/0442 709/221 |
| 2005/0076220 | A1 | 4/2005 | Zhang et al. |
| 2005/0131811 | A1 | 6/2005 | Ranzini et al. |
| 2005/0144239 | A1 | 6/2005 | Mattathil |
| 2005/0182938 | A1 | 8/2005 | Seshadri |
| 2005/0216550 | A1 | 9/2005 | Paseman et al. |
| 2005/0257261 | A1 | 11/2005 | Shraim et al. |
| 2005/0262209 | A1 | 11/2005 | Yu |
| 2005/0268090 | A1 | 12/2005 | Saw et al. |
| 2006/0041505 | A1 | 2/2006 | Enyart |
| 2006/0075027 | A1 | 4/2006 | Zager et al. |
| 2006/0075030 | A1 | 4/2006 | van Riel |
| 2006/0200523 | A1 | 9/2006 | Tokuda et al. |
| 2007/0162394 | A1 | 7/2007 | Zager et al. |
| 2012/0136948 | A1 | 5/2012 | Zager et al. |
| 2015/0089229 | A1 | 3/2015 | Zager et al. |

FOREIGN PATENT DOCUMENTS

| | | |
|---|---|---|
| WO | WO-2006094184 A2 | 9/2006 |
| WO | WO-2006094184 A3 | 9/2006 |

OTHER PUBLICATIONS

"U.S. Appl. No. 10/778,956, Advisory Action dated May 3, 2007", 2 pgs.

"U.S. Appl. No. 10/778,956, Advisory Action dated May 19, 2006", 3 pgs.

"U.S. Appl. No. 10/778,956, Advisory Action dated May 29, 2008", 3 pgs.

"U.S. Appl. No. 10/778,956, Final Office Action dated Jan. 29, 2007", 10 pgs.

"U.S. Appl. No. 10/778,956, Final Office Action dated Jan. 31, 2006", 14 pgs.

"U.S. Appl. No. 10/778,956, Final Office Action dated Feb. 4, 2009", 9 pgs.

"U.S. Appl. No. 10/778,956, Final Office Action dated Feb. 12, 2008", 10 pgs.

"U.S. Appl. No. 10/778,956, Non Final Office Action dated Jul. 31, 2006", 7 pgs.

"U.S. Appl. No. 10/778,956, Non-Final Office Action dated Jul. 8, 2005", 12 pgs.

"U.S. Appl. No. 10/778,956, Non-Final Office Action dated Jul. 28, 2008", 8 pgs.

"U.S. Appl. No. 10/778,956, Non-Final Office Action dated Aug. 23, 2007", 10 pgs.

"U.S. Appl. No. 10/778,956, Response filed Apr. 2, 2007 to Final Office Action dated Jan. 29, 2007", 12 pgs.

"U.S. Appl. No. 10/778,956, Response filed Apr. 7, 2006 to Final Office Action dated Jan. 31, 2006", 41 pgs.

"U.S. Appl. No. 10/778,956, Response filed Apr. 14, 2008 to Final Office Action dated Feb. 12, 2008", 10 pgs.

"U.S. Appl. No. 10/778,956, Response filed May 29, 2007 to Final Office Action dated Jan. 29, 2007", 9 pgs.

"U.S. Appl. No. 10/778,956, Response filed May 31, 2006 to Advisory Action dated May 19, 2006", 8 pgs.

"U.S. Appl. No. 10/778,956, Response filed Oct. 28, 2008 to Non-Final Office Action dated Jul. 28, 2008", 8 pgs.

"U.S. Appl. No. 10/778,956, Response filed Oct. 31, 2006 to Non Final Office Action dated Jul. 31, 2006", 9 pgs.

"U.S. Appl. No. 10/778,956, Response filed Nov. 7, 2005 to Non Final Office Action dated Jul. 8, 2005", 40 pgs.

"U.S. Appl. No. 10/778,956, Response filed Nov. 21, 2007 to Non-Final Office Action dated Aug. 23, 2007", 10 pgs.

(56) References Cited

OTHER PUBLICATIONS

"U.S. Appl. No. 11/072,608 Final Office Action dated Sep. 16, 2010", 19 pgs.
"U.S. Appl. No. 11/072,608, Final Office Action dated May 18, 2009", 31 pgs.
"U.S. Appl. No. 11/072,608, Non-Final Office Action dated Nov. 13, 2008", 21 pgs.
"U.S. Appl. No. 11/072,608, Non-Final Office Action dated Dec. 28, 2009", 32 Pgs.
"U.S. Appl. No. 11/072,608, Preliminary Amendment filed Mar. 8, 2006", 22 pgs.
"U.S. Appl. No. 11/072,608, Response filed Sep. 22, 2008 to Restriction Requirement dated Aug. 20, 2008", 13 pgs.
"U.S. Appl. No. 11/072,608, Response filed Nov. 18, 2009 to Final Office Action dated May 18, 2009", 16 pgs.
"U.S. Appl. No. 11/072,608, Response filed Feb. 13, 2009 to Non-Final Office Action dated Nov. 13, 2008", 16 pgs.
"U.S. Appl. No. 11/072,608, Response filed Jun. 28, 2010 to Non Final Office Action dated Dec. 28, 2009", 18 pgs.
"U.S. Appl. No. 11/072,608, Restriction Requirement dated Aug. 20, 2008", 11 pgs.
"U.S. Appl. No. 11/072,791, Examiner Interview Summary dated Mar. 4, 2011", 3 pgs.
"U.S. Appl. No. 11/072,791, Final Office Action dated Jun. 24, 2011", 16 pgs.
"U.S. Appl. No. 11/072,791, Final Office Action dated Dec. 15, 2009", 10 pgs.
"U.S. Appl. No. 11/072,791, Non-Final Office Action dated Mar. 4, 2009", 12 pgs.
"U.S. Appl. No. 11/072,791, Non-Final Office Action dated Oct. 18, 2010", 10 pgs.
"U.S. Appl. No. 11/072,791, Notice of Allowance dated Aug. 8, 2011", 14 pgs.
"U.S. Appl. No. 11/072,791, Notice of Allowance dated Oct. 14, 2011", 9 pgs.
"U.S. Appl. No. 11/072,791, Response filed Mar. 7, 2011 to Non-Final Office Action dated Oct. 18, 2010", 11 pgs.
"U.S. Appl. No. 11/072,791, Response filed Jun. 10, 2010 to Final Office Action dated Dec. 15, 2009", 16 pgs.
"U.S. Appl. No. 11/072,791, Response filed Jul. 14, 2011 to Non-Final Office Action dated Apr. 14, 2011", 8 pgs.
"U.S. Appl. No. 11/072,791, Response filed Aug. 28, 2009 to Non Final Office Action dated Mar. 4, 2009", 17 pgs.
"U.S. Appl. No. 11/518,071, Final Office Action dated Apr. 8, 2011", 12 pgs.
"U.S. Appl. No. 11/518,071, Final Office Action dated Oct. 29, 2009", 7 pgs.
"U.S. Appl. No. 11/518,071, Non Final Office Action dated Dec. 9, 2010", 6 pgs.
"U.S. Appl. No. 11/518,071, Non-Final Office Action dated Jan. 13, 2009", 10 pgs.
"U.S. Appl. No. 11/518,071, Preliminary Amendment filed Oct. 30, 2007", 6 pgs.
"U.S. Appl. No. 11/518,071, Response filed Jan. 12, 2010 to Final Office Action dated Oct. 29, 2009", 7 pgs.
"U.S. Appl. No. 11/518,071, Response filed Jul. 13, 2009 to Non Final Office Action dated Jan. 13, 2009", 6 pgs.
"U.S. Appl. No. 11/518,071, Response filed Dec. 15, 2008 to Restriction Requirement dated Nov. 13, 2008", 6 pgs.
"U.S. Appl. No. 11/518,071, Response filed Dec. 30, 2010 to Non Final Office Action dated Dec. 9, 2010", 7 pgs.
"U.S. Appl. No. 11/518,071, Restriction Requirement dated Nov. 13, 2008", 6 pgs.
"U.S. Appl. No. 13/269,837, Final Office Action dated Feb. 4, 2014", 7 pgs.
"U.S. Appl. No. 13/269,837, Non Final Office Action dated Mar. 29, 2013", 6 pgs.
"U.S. Appl. No. 13/269,837, Notice of Allowance dated Sep. 22, 2014", 8 pgs.
"U.S. Appl. No. 13/269,837, Response filed Aug. 4, 2014 to Final Office Action dated Feb. 4, 2014", 5 pgs.
"U.S. Appl. No. 13/269,837, Response filed Sep. 30, 2013 to Non Final Office Action dated Mar. 29, 2013", 5 pgs.
"U.S. Appl. No. 14/556,332, Advisory Action dated Dec. 29, 2017", 3 pgs.
"U.S. Appl. No. 14/556,332, Final Office Action dated Sep. 22, 2016", 11 pgs.
"U.S. Appl. No. 14/556,332, Final Office Action dated Oct. 5, 2017", 12 pgs.
"U.S. Appl. No. 14/556,332, Non Final Office Action dated Jan. 5, 2016", 11 pgs.
"U.S. Appl. No. 14/556,332, Non Final Office Action dated May 4, 2017", 11 pgs.
"U.S. Appl. No. 14/556,332, Notice of Allowance dated Jun. 6, 2018", 5 pgs.
"U.S. Appl. No. 14/556,332, Preliminary Amendment filed Dec. 2, 2014", 6 pgs.
"U.S. Appl. No. 14/556,332, Response filed Mar. 22, 2017 to Final Office Action dated Sep. 22, 2016", 9 pgs.
"U.S. Appl. No. 14/556,332, Response Filed Apr. 4, 2018 to Advisory Action dated Dec. 29, 2017", 9 pgs.
"U.S. Appl. No. 14/556,332, Response filed Jul. 5, 2016 to to Non Final Office Action dated Jan. 5, 2016", 10 pgs.
"U.S. Appl. No. 14/556,332, Response filed Sep. 21, 2017 to Non Final Office Action dated May 4, 2017", 9 pgs.
"U.S. Appl. No. 14/556,332, Response filed Dec. 5, 2017 to Final Office Action dated Oct. 5, 2017", 8 pgs.
"European Application Serial No. 07253525.5, Office Action dated Oct. 18, 2011", 7 pgs.
"European Application Serial No. 07253525.5, Summons to Attend Oral Proceedings dated Oct. 21, 2013", 7 pgs.
"European Application Serial No. 07253525.5-1244, Extended European Search Report dated Nov. 23, 2007", 8 pgs.
"International Application Serial No. PCT/US2005/002397, International Preliminary Report on Patentability dated Aug. 24, 2006", 10 pgs.
"International Application Serial No. PCT/US2006/007573, International Preliminary Report on Patentability dated Sep. 20, 2007", 5 pgs.
"International Application Serial No. PCT/US2006/007573, International Search Report dated Aug. 17, 2006", 4 pgs.
"International Application Serial No. PCT/US2006/007573, Written Opinion dated Aug. 17, 2006", 3 pgs.
Fahlman, Scott E., "Selling Interrupt Rights: A way to control unwanted e-mail and telephone calls", IBM Systems Journal, 41(4), (Nov. 2002).
Templeton, Brad, "E-Stamps", [Online]. Retrieved from the Internet: <URL:http://www.templetons.com/brad/spam/estamps.html>, (Apr. 30, 2003).

* cited by examiner

RAPID IDENTIFICATION OF MESSAGE AUTHENTICATION

CROSS-REFERENCE TO RELATED APPLICATIONS

The present application is a continuation of U.S. patent application Ser. No. 14/556,332, filed Dec. 1, 2014, entitled "RAPID IDENTIFICATION OF MESSAGE AUTHENTICATION" which is a continuation of U.S. patent application Ser. No. 13/269,837, filed Oct. 10, 2011, entitled "RAPID IDENTIFICATION OF MESSAGE AUTHENTICATION" which is a continuation of U.S. patent application Ser. No. 11/518,071, filed on Sep. 8, 2006, entitled "RAPID IDENTIFICATION OF MESSAGE AUTHENTICATION," which is continuation-in-part of U.S. patent application Ser. No. 10/778,956, filed on Feb. 12, 2004, entitled "METHOD AND APPARATUS FOR IMPLEMENTING A MICRO-PAYMENT SYSTEM TO CONTROL E-MAIL SPAM," which applications are incorporated herein by reference in their entirety.

FIELD

The invention relates generally to network security and more particularly to message authentication mechanisms.

BACKGROUND

Electronic mail (email) communication is becoming increasingly pervasive throughout the world. Enterprises rely on email to conduct business, governments rely on email to communicate, and individuals rely on email to conduct their affairs.

In recent years, email communication has expanded to include Instant Messaging (IM) and Text Messaging. Communications now use any computer (processing device) or combination of portable devices that may interact wirelessly or interact over a combination of wired and wireless networks. Some techniques also use groupware where more than two or more people interact with one another via direct communications. These techniques present real-time or near real-time communication with individuals via their portable devices, such as Personal Digital Assistants (PDA's), phones, etc. IM has also become popular in virtual communities, where members interact with one another electronically in user-formed communities, associations, or groups.

Unfortunately, mass marketers and nefarious individuals have watered down the usefulness of email communication. That is, spam, Phishing techniques, and even computer viruses are now regularly proliferated via email. As a result, many individuals and entities have invested in expensive filtering mechanisms and/or have limited the extent to which they may view their messages. In some cases, individuals may even carry multiple email accounts and may only view some of their email accounts on a very infrequent basis. These situations make it difficult for legitimate enterprises to reach their customers/clients.

In effect, individuals have become desensitized to their email because their inboxes are bursting with far too many junk emails of no value to them or even worse potentially harmful to them. Harmful emails can include such things as viruses that damage a users' device or files or Phishing emails that link a user to a bogus World-Wide Web (WWW) site for purposes of obtaining confidential information about the user. The latter technique is often used to illegally access financial accounts and/or to assume an online identity of a user.

SUMMARY

In various embodiments, techniques are presented for rapid identification of message authentication. In one embodiment a method is provided that identifies a message directed to a recipient and determines when the message includes identifying information associated with a sender of that message. When the identifying information is present, an external service is requested to authenticate an identity of the sender and to provide distinctive metadata with the message for purposes of uniquely identifying the sender to the recipient.

DETAILED DESCRIPTION

Figure 1:
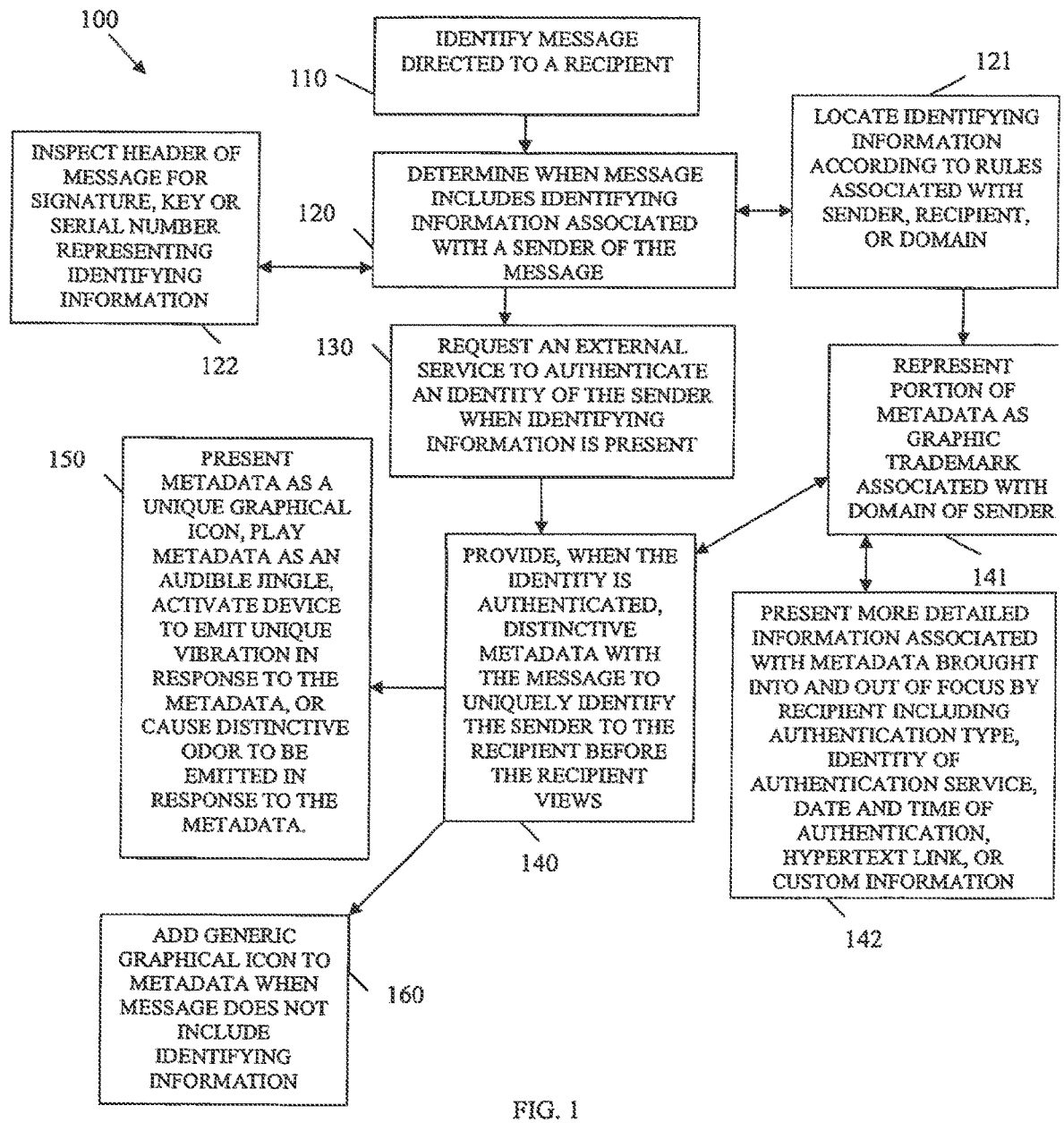
FIG. 1 is a diagram of method for rapidly identifying message authentication, according to an example embodiment.

FIG. 1 is a diagram of method 100 for rapidly identifying message authentication, according to an example embodiment. The method 100 (hereinafter "message authentication service") is implemented as instructions in a machine-accessible and readable medium. The instructions when accessed by a machine perform the processing depicted in FIG. 1. The message authentication service is also operable over a network, and the network may be wired, wireless, or a combination of wired and wireless.

Initially, a message, such as an electronic mail (email), message is constructed by a sender using a sender's message client or messaging service and is sent over a network, such as the Internet, to a recipient. The header information associated with the message can include a variety of information that the message authentication service may subsequently detect and use for purposes of ensuring that the message is authenticated.

For example, the message may include a signature, a key, such as a public key of a domain or of a specific sender. Alternatively, the message may include a serial number. In some cases, the message may just include the domain path from an originating sender's messaging server that the message originated from. In still other situations, the header may include a variety or multiple types of information that may be relevant to authentication of either the sender or the domain of the sender.

The message client of the sender may or may not be modified to include the additional information (herein referred to as "identifying information") included in the header of a message. That is, the message client may be designed to cooperate and supply information expected by the message authentication service or the message client may be completely unaware of the message authentication service and may construct and send messages in a normal fashion having normal header information assembled by the sender's messaging client.

When the message is received on or within the environment of the recipient of the message, the message authentication service intercepts and initially inspects the message. This may be achieved via a prior configuration with the messaging client of the recipient or may be achieved via a reverse or transparent proxy arrangement, where the message authentication service operates unbeknownst to the recipient's messaging client and intercepts and inspects headers of received messages, which are directed to a recipient.

The processing of the message authentication service is designed to rapidly authenticate a received message's sender and/or a sender's domain. It is noted that only identified domains or senders may be authenticated and inspected by the message authentication service. That is, some messages may process normally in the recipient's messaging client without authentication techniques (described more completely below) being performed by the message authentication service. The specific senders or domains that are authenticated may be identified according to custom rules or policies. This permits some messages to process normally whereas others are selectively processed in the manners described more completely below.

With this initial context, the processing of the message authentication service will now be discussed with reference to FIG. 1. At 110, the message authentication service identifies a message that is being directed to a recipient. This identification process may occur in a variety of manners. For example, the message authentication service may intercept the message before it is received by a messaging client of the recipient. Alternatively, the message authentication service may cooperate and integrate with at least some processing of the recipient's messaging client to detect and identify the received message.

At 120, the message authentication service determines when a message includes identifying information that the message authentication service is interested in knowing about. The identifying information may, at 121, be located, detected, or discovered according to rules or policies, and these rules or policies may be associated with a specific sender, a specific domain, and/or a specific recipient. In some cases, at 122, the identifying information is detected by inspecting the header of a message for a key, a signature, serial number, or various combinations of these things representing the identifying information. It is also noted that the identifying information may be a path for a domain or may be a custom hash or encryption key as well. The identifying information was previously inserted by the messaging client of the sender either in normal manners or in a custom manner designed to interact and cooperate with the processing of the message authentication service.

At 130, the message authentication service makes a request to an external service to authenticate an identity of the sender or an identity of the domain associated with the sender by supplying the identifying information parsed from the message or header of the message. Again, policies or rules may drive the specific identity of the external authentication service and the technique that is to be performed to authenticate the sender or the domain of the sender.

For example, suppose that the identifying information is a signature associated with America Online, such that America Online or Verisign® can be consulted to acquire a key, which was previously used to generate a signature value that is included in the message header. The independently acquired key is then used to generate an independent signature value from the message text and/or header, which can then be compared to a signature value supplied as the identifying information with the message or message header. If a match occurs than this type of authentication technique may be viewed as successful.

It is noted that the type of authentication and the level of confidence associated with the authentication are customizable and may be altered according to rules or policies. So, multiple levels of authentication, strong authentication, or weak authentication may be used according to subscription services and rules or policies for any given recipient, sender, and/or domain.

As another example, consider a message that is encrypted with public and private key encryption. The public key of the recipient may be used in combination with a private key of the sender or domain and used to encrypt the entire message text. The type of authentication may be listed as the identifying information in the header of the message and the message authentication service may consult an external service to decrypt the message using a server-administered private key for the sender or domain. If decryption occurs, then authentication was successful. This type of authentication may be viewed as stronger since dual key encryption is used and since the server administers and maintains the private keys without distributing them and supplies a decryption service that decrypts the encrypted message text on behalf of the recipient. Alternatively, a service may provide the public key and decryption can be done independently by an administrator. For example, decryption could be done locally by a user's or recipient's machine, device, or locally accessible devices.

In fact, a variety of identifiers and authentication may be used. The degree of complexity and level of security are customizable and can be integrated with the teachings presented herein.

At 140, the message authentication service provides distinctive metadata that is to be associated with the received message when the identity or domain of the sender is properly authenticated. The distinctive metadata permits a recipient to rapidly discern that the message has been authenticated with respect to either the sender or the domain or both the sender and the domain. Moreover, the distinctive metadata can change over time. For instance, an enterprise may change its logo. So, the distinctive metadata does not have to be viewed as being static, in some cases policies may permit it to be dynamically updated or altered as needed or desired. It is also noted that the distinctive metadata is displayed within the inbox of the messaging client for the recipient and does not have to be displayed within the message itself.

For example, at 141, a portion of the distinctive metadata may be a graphic trademark icon or image associated with a domain of the sender. So, if the domain is America Online®, a portion of the distinctive metadata may be a trademark logo image associated with American Online®. It is noted, that the graphical image or icon does not have to be associated with an enterprise, it may just as easily be associated with a specific individual. In some cases, the image or icon may be associated with a specific email address and multiple individuals may share the same email address. So, the degree of specificity may be customized. Graphic image or icon customization may occur at the email level, at email aggregation levels for groups, at the domain level, at sub domain levels, etc. Moreover, the specific graphical image or icon may be customized and assigned by either the recipient or the sender according to their own desired profiles. Moreover, multiple domains that are identified with a specific enterprise may be mapped to a single graphical icon or image for that enterprise.

According to an embodiment, at 142, a variety of more detailed information may also be associated with various other portions of the distinctive metadata. For instance, a specific authentication type, an identity for the sender, an identity for the sender's domain, and/or a date and time that authentication was performed. In fact, the detailed information may also include other related information such as hypertext links to other information or to recipient-defined custom information. The detailed information may be presented when the recipient brings the graphical image or icon into focus within the recipient's messaging client. For example, a mouse may be situated over an icon and when this occurs focus is directed to the distinctive metadata and the additional information is depicted for the recipient to view. In other cases, the graphical icon is selectable such that when it is double-clicked on the detailed information pops up in another window for the recipient to view.

In fact, the distinctive metadata does not have to exclusively be limited to graphical images. At 150, the metadata may be represented as an audible sound or jingle, a unique vibration, or even a distinct odor. So, the distinctive metadata may be used to drive aspects of devices that may cause the devices to perform some other operation, such as vibrate, play a tune, or emit an odor.

The point is that the identifying information included and detected with the message is validated or authenticated according to policy or rule and then other policies or rules permit distinctive metadata to be associated with successful validation or authentication. The distinctive metadata is then integrated into features of the recipient's messaging client to rapidly communicate to the recipient that the message is authentic. The degree of information presented and the manner in which the presentation is made is also configurable according to one or more rules or policies.

In an embodiment, at 160, the recipient's messaging client may also be configured to include distinctive metadata for each message received in spite of the fact that some messages may not actually participate in the authentication process described above. In such scenarios, the message authentication service may produce a generic graphical icon and add it to a non participating message's metadata. This generic graphical icon may be used to rapidly alert the recipient to the fact that a particular message did not undergo the normal authentication process. The recipient may then decide to route such messages to predefined folders for further processing, such as virus scans, spam filters, etc., or may elect to discard or view the messages at the recipient's own peril.

In this manner, a recipient may be capable of readily discerning from a listing of messages which messages are authenticated and which are not; and, in the case of processing at 150, graphical information that is highly likely to identify the sender (e.g., a bofa logo, etc.) Custom filters or routing algorithms may also be applied in response to the metadata added by the message authentication service, if desired by the recipient. Moreover, each message may be associated with different degrees of authentication and may include custom levels of information in their metadata.

As an example application, consider a web-based email client that presents a listing of emails along with some message-client supplied metadata, such as sender identification, subject header, date and time received, etc. The processing of the message authentication service may be integrated to sit on top of such a client to alter the presentation of the listing to include customized graphical images and customized metadata for messages that have been authenticated, or in some cases for all messages including those not participating. Each image may rapidly identify for the recipient the identity of the sender and/or the identity of the domain used by the sender. The authentication may include sender and domain, just the domain, or just the sender. A recipient may also mouse over or select any given image and receive other custom information from the custom metadata supplied by the message authentication service. The recipient may also set up filters or routing algorithms to automatically process messages in response to information included in the custom metadata. Such processing permits rapid identification of message authentication from the perspective of the recipient.

It is also noted, that the message authentication service may actually be a remote service that is not directly installed within the environment of the recipient's message client. In such cases, a proxy may be used to detect messages and forward them to the remote message authentication service for generation of the custom and distinct metadata. Another application may superimpose the custom and distinct metadata in views presented by the recipient's message client. So, the message authentication service does not have to be integrated and coupled with the recipient's messaging client; although it can be.

It is also worth noting that techniques of the message authentication service are not specifically limited to email-based messaging. That is, any type of messaging such as IM and TM may be used and may benefit from the techniques presented herein. For example, a phone's TM or IM capabilities may be augmented to process the message authentication service, such that authentication is rapidly identified via custom vibrations and/or custom sounds and images.

Figure 2:
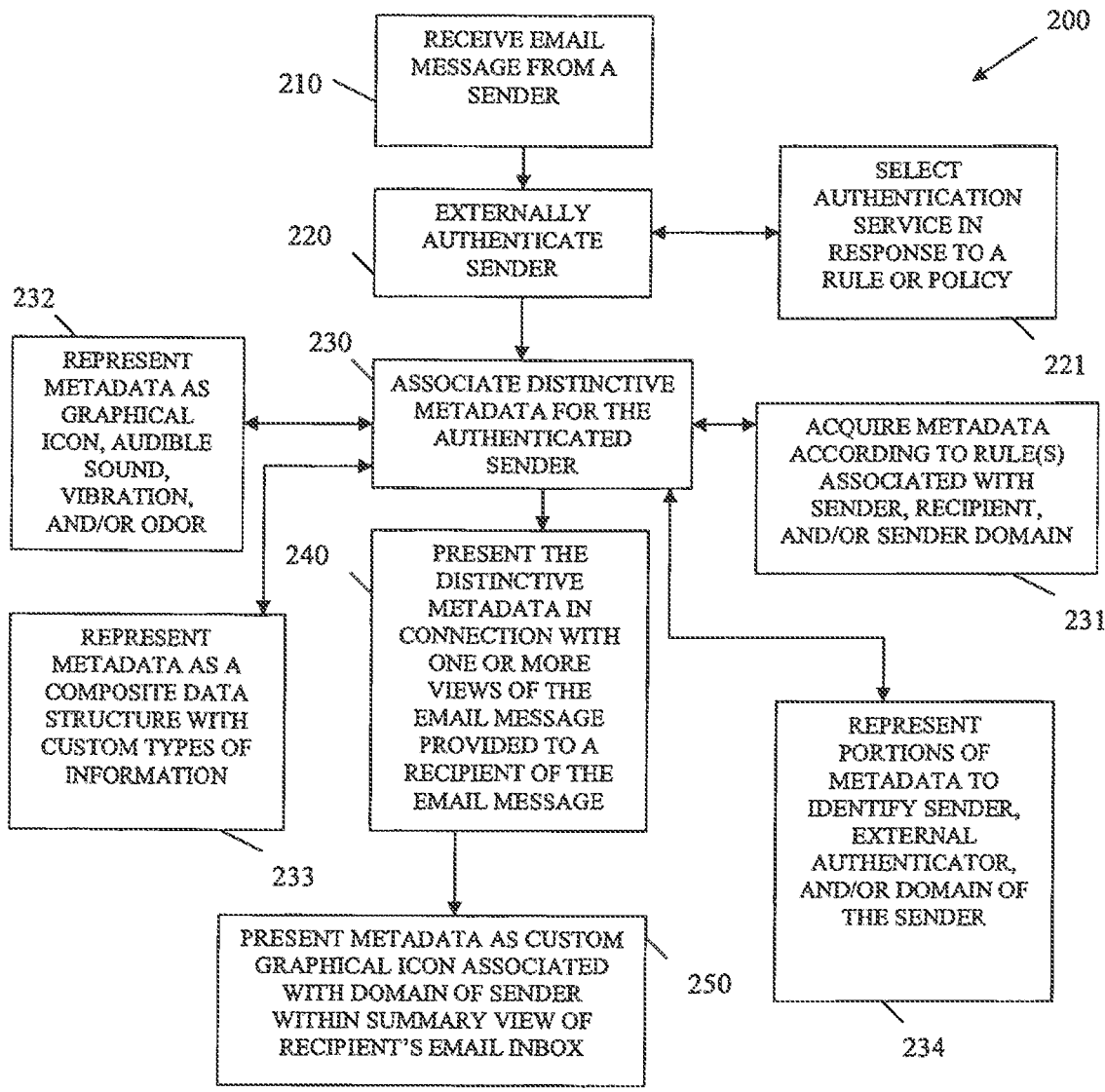
FIG. 2 is a diagram of another method for rapidly identifying message authentication, according to an example embodiment.

FIG. 2 is a diagram of another method 200 for rapidly identifying message authentication, according to an example embodiment. The method (hereinafter referred to a "message authentication identifying service") is implemented as instructions in a machine-accessible and readable medium and is accessible over a network. The network may be wired, wireless, or a combination of wired and wireless. The instructions when accessed by a machine perform the processing depicted in FIG. 2. The message authentication identifying service presents an alternative processing perspective to what was presented above with respect to the method 100 of the FIG. 1.

At 210, the message authentication identifying service receives an email message from a sender. Again, receipt of this email may occur in a variety of manners, such as direct forwarding from a recipient's email client, interception of the message before being received by the recipient's email client, and the like.

At 220, the message authentication identifying service externally authenticates the sender and/or domain of the sender. That is, the message authentication identifying service enlists the services of an external system or application to provide an indication that the email received is in fact from a sender that it purports to be sent from and/or is in fact coming from a domain that is trusted or known to be associated with the sender or from an entity that the message authentication identifying service trusts.

According to an embodiment, at 221, the particular authentication service that the message authentication identifying service enlists help from may be selected in response to a dynamically evaluated rule or policy. So, the message authentication identifying service may dynamically and in real time determine the identity of the authentication service to request authentication from. Determination for the rule or policy may be based on a variety of factors, such as the perceived identity of the sender, the perceived identity of the domain, a license agreement between the recipient and the message authentication identifying service, and the like.

At 230, the message authentication identifying service associates distinctive metadata for any authenticated sender and/or domain. Custom and distinctive metadata is generated, acquired, or assigned to the email in response to successful authentication. According to an embodiment, at 231, this may entail acquiring the metadata according to rules associated with the sender, the recipient, and/or the domain of the sender.

In an embodiment, at 232, the metadata may be represented in a variety of different manners or in a combination of manners. So, the metadata may be represented as a graphical icon image, an audible sound, a vibration, an odor, or various combinations of these things.

At 233, the metadata may also be represented as a composite data structure so as to include a variety of additional beneficial information. For example, the composite data structure may include custom information types that identify various types of information included within the metadata (e.g., hypertext links, images, sounds, etc.). In some cases, the schema associated with the metadata may be represented in as a Extensible Markup Language (XML) Schema Definition (XSD). This permits subsequent applications to automatically parse, recognize, integrate, and utilize the composite data structure in an automatic, dynamic and real-time fashion.

In still more embodiments, at 234, the message authentication identifying service may represent different portions of the metadata to identify the sender, the external authenticator (external authentication service used), and/or the domain of the sender. So, the metadata may include a variety of useful information that the recipient may view or acquire in a variety of custom manners.

At 240, the message authentication identifying service presents the distinctive metadata, or at least a portion of the distinctive metadata, in connection with one or more views of the email message that is provided to the recipient. For example, at 250, a portion of the custom metadata may be a graphical icon associated with the identity of either the sender or the domain of the sender or both. The graphical icon is presented for viewing by the recipient within a summary or listing view of the recipient's email inbox.

Figure 3:
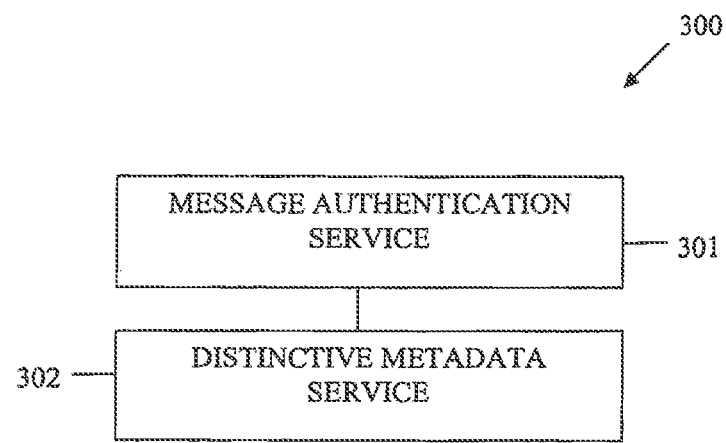
FIG. 3 is a diagram of a message authentication system, according to an example embodiment.

FIG. 3 is a diagram of a message authentication system 300, according to an example embodiment. The message authentication system 300 is implemented in a machine-accessible and readable medium and is accessible over a wired, wireless, or a combination of wired and wireless networks. The message authentication system 300 implements, among other things, the methods 100 and 200 presented above with reference to the FIGS. 1 and 2.

The message authentication system 300 includes a message authentication service 301 and a distinctive metadata service 302. Each of these will now be discussed in turn.

The message authentication service 301 operates on top of or within an environment of a recipient's message client. As messages are received within the environment of the recipient, the message authentication service 301 is activated either directly or indirectly, such as via calls from a proxy (reverse or transparent proxy). The message authentication service 301 interacts with one or more external authentication services for purposes of authenticating messages received with respect to the identity of the sender, contents of the message itself, and/or the identity of the sender's domain. Example processing for parsing identifying information from messages and enlisting such services were discussed above in detail with respect to the methods 100 and 200 of the FIGS. 1 and 2, respectively.

The contents of the messages may be authenticated by validating signatures supplied as identifying information with the messages. Another example of this would be to decrypt encrypted messages, validate keys, validate serial numbers, etc. So, authentication may occur with respect to the sender, the domain, or the contents (with successful third party decryption of the contents), or combinations of all three of these items.

In some cases, the message authentication service 301 intercepts or acquires messages and enlists the services of one or more external authentication services to authenticate messages before these messages are presented to a recipient within a recipient's email or message client. It is noted that only selective messages have to be processed by the message authentication service 301; that is, some messages may not be processed or may be ignored or generically processed by the message authentication service 301. Such scenarios were described above with respect to the method 100 and the FIG. 1. This may occur when a recipient desires that only certain domains or senders are to be processed or when a recipient desires to have all non participating senders or domains to be processed in a uniform manner so as to be readily identified by the recipient.

In other cases, the message authentication service 301 may be configured to request the external authentication or the messages when specifically requested to do so by a recipient and/or after the messages are viewed or accessible to the recipient. So, authentication does not have to occur before the messages are processed; although this can occur in some embodiments.

The message authentication service 301 interacts with the distinctive metadata service 302 for purposes of communicating authenticated senders, domains, or message contents. The distinctive metadata service 302 may use one or more custom-defined rules or policies to generate or acquire distinctive metadata to associate with authenticated messages.

According to an embodiment, the distinctive metadata service 302 is external to the message authentication service 301. So, the distinctive metadata service 302 may be its own distinct and generic server-based service that can be dynamically consulted and interacted with.

The distinctive metadata service 302 generates custom information for an authenticated message that is associated with metadata for that message. The information may be a graphic icon or it may be a combination of information. Additionally, the information may be a sound, a vibration, an odor, and the like. At least a portion of the information is presented with the message and summary listings of the message within the recipient's message client for purposes of permitting the recipient to rapidly identify the message's authentication. Other portions of the information may be acquired and brought into focus by the recipient or when specifically requested by the recipient.

In some cases, the distinctive metadata service 302 may provide generic metadata for messages not associated with the authentication of the message authentication service 301. So, each message not processed by the message authentication service 301 may receive its own generic identifying information.

Example processing associated with the distinctive metadata service 302 and the message authentication service 301 were presented above with respect to the methods 100 and 200 of the FIGS. 1 and 2.

It is also noted that the metadata may be include a variety of information that may be used to automatically filter or process the messages. Additionally, the messaging clients may include email, IM, and/or TM. The degree or authentication and level of metadata information and the manner in which it is presented with a message are all customizable and may be dynamically resolved according to rule or policy.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A method, comprising:
    identifying, by executable instructions that execute on a hardware processor, a message received from a sender and directed to a recipient within a message client, wherein the message is an email sent from the sender to the recipient;
    obtaining, by the executable instructions, metadata associated with the sender based at least in part on identifying information for the sender that is included in a header of the message, wherein the identifying information comprising a type of authentication for authenticating the sender and a key for the sender;
    authenticating the sender by processing the type of authentication with the key;
    authenticating contents of the message using signatures supplied with the identifying information;
    authenticating a network domain of the sender and
    presenting, by the executable instructions, different levels of detail associated with the metadata within the message client based on the authenticating of the sender, the contents and the network domain, wherein presenting further includes presenting the metadata obtained for the message at the different levels of detail that includes custom recipient information, custom sender authentication information, and wherein presenting further includes presenting at least a portion of the metadata as a distinctive image assigned to the sender.

2. The method of claim 1, wherein obtaining further includes processing rules that are specific to the identifying information to locate and obtain the metadata.

3. The method of claim 1, wherein authenticating the sender further includes making a request to an external service that is external to the message client requesting the external service the authenticating of the sender based on the identifying information.

4. The method of claim 3, wherein making further includes identifying the external service from a plurality of external services based on evaluation of authentication policies.

5. The method of claim 1, wherein authenticating the sender further includes determining a level of authentication from a plurality of levels of authentication and performing the authenticating for the sender of the message based on the level authentication determined.

6. The method of claim 1, wherein presenting further includes providing the metadata as a visual indication representing the sender.

7. The method of claim 6, wherein providing further includes providing with the visual indication a plurality of information uniquely representing the sender and indicating that the sender has been authenticated.

8. The method of claim 1, wherein presenting further includes providing with the metadata with information representing the type of authentication and one or more of: an identify for the network domain associated with a sender email address of the sender, a date and a time that the sender was authenticated, and a hypertext link to recipient-defined custom information.

9. The method of claim 1, wherein presenting further includes presenting a first portion of the metadata within an inbox listing of the message client and a second portion of the metadata when the message is brought into focus within the message client by the recipient from the inbox listing.

10. The method of claim 9, wherein presenting further includes presenting a third portion of the metadata when the first portion or the second portion is selected by the recipient.

11. The method of claim 10, wherein presenting further include integrating the first portion, the second portion, and the third portion into the message client as features of the message client.

12. A method, comprising;
    authenticating, by executable instructions that execute on a hardware processor of a message client, a sender of a message directed to a recipient of the message by using a type of authentication and a key obtained from a header of the message, wherein the message is an email sent from the sender to the recipient;
    authenticating, by the executable instructions, contents of the message using signatures supplied in identifying information of the header;
    authenticating, by the executable instructions, a network domain of the sender;
    obtaining, by the executable instructions, distinctive metadata that is unique to the authenticating of the sender, the authenticating of the contents, and the authentication of the network domain, the recipient, wherein obtaining further includes presenting at least a portion of the distinctive metadata as a distinctive image assigned to the sender; and
    integrating, by the executable instructions, the distinctive metadata into features of the message client when the distinctive metadata is: presented with a summary listing of messages within the message client, brought into focus within the summary listing, and selected from the summary listing.

13. The method of claim 12, wherein authenticating the sender further includes identifying an external service to request authentication from identifying information that is included in the header, wherein the identifying information comprising at least the key and the type of authentication.

14. The method of claim 12, wherein obtaining further includes processing policies associated with the authenticating and the sender to generate the distinctive metadata.

15. The method of claim 14, wherein processing further includes generating the distinctive metadata as: a first portion presented within the summary listing, a second portion presented when the first portion is brought into focus within the summary listing, and a third portion presented when the first portion or the second portion is selected by the recipient within the summary listing.

16. A system, comprising:
   a processor configured to process executable instructions from a non-transitory computer-readable storage medium within a processing environment of a message client; and
   the executable instructions configured to:
   authenticate a sender of a message being directed to the message client of a recipient by using a type of authentication and a key obtained from a header of the message, wherein the message is an email sent from the sender to the recipient;
   authenticate contents of the message using signatures supplied in identifying information of the header;
   authenticate a network domain of the sender;
   obtain distinctive metadata that is unique to the sender, the recipient, and to authentication of the sender, the contents, and the network domain, and further present at least a portion of the metadata as a distinctive image assigned to the sender; and
   integrate the distinctive metadata into the message client with different levels of detail presented based on:
   a summary listing view of the message within the message client, an in-focus view of the distinctive metadata that is brought into focus within the summary listing view, and selected view based on selection of the metadata by the recipient within the summary listing view.

17. The system of claim 16, wherein the processor is a proxy device for the message client.

* * * * *